United States Patent
Ittelson et al.

(10) Patent No.: US 12,395,609 B1
(45) Date of Patent: Aug. 19, 2025

(54) LICENSE-BASED VIDEO CONFERENCE SESSION FACILITATION

(71) Applicant: Zoom Communications, Inc., San Jose, CA (US)

(72) Inventors: Brendan James Ittelson, San Jose, CA (US); Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 202 days.

(21) Appl. No.: 18/309,418

(22) Filed: Apr. 28, 2023

(51) Int. Cl.
*H04N 7/15* (2006.01)
*H04L 9/32* (2006.01)

(52) U.S. Cl.
CPC .......... *H04N 7/157* (2013.01); *H04L 9/3213* (2013.01); *H04N 7/152* (2013.01); *H04N 7/155* (2013.01)

(58) Field of Classification Search
CPC ........ H04N 7/152; H04N 7/155; H04N 7/157; H04L 9/3213
USPC ...................................................... 348/14.09
See application file for complete search history.

(56) References Cited

U.S. PATENT DOCUMENTS

| | | | |
|---|---|---|---|
| 7,035,918 B1 | 4/2006 | Redding et al. | |
| 7,231,370 B1 | 6/2007 | Kapur | |
| 7,240,366 B2 * | 7/2007 | Buch | H04L 63/0823 713/153 |
| 9,232,067 B2 * | 1/2016 | Leigh | H04L 63/061 |
| 10,949,505 B2 | 3/2021 | Dargar et al. | |
| 11,790,054 B2 * | 10/2023 | Yan | H04L 9/0825 |
| 11,916,985 B1 * | 2/2024 | Costello | H04L 12/1831 |
| 2006/0085350 A1 | 4/2006 | Samayamantry et al. | |
| 2010/0189260 A1 * | 7/2010 | Ramanathan | H04L 65/1069 380/259 |
| 2011/0286584 A1 * | 11/2011 | Angel | H04M 3/42221 379/88.02 |
| 2015/0026079 A1 * | 1/2015 | Walker | G06Q 30/00 705/310 |
| 2023/0281278 A1 * | 9/2023 | Fernandez Garcia | G06F 21/105 705/59 |

* cited by examiner

*Primary Examiner* — Binh Kien Tieu
(74) *Attorney, Agent, or Firm* — Young Basile Hanlon & MacFarlane, P.C.

(57) ABSTRACT

A video conference session is enabled using a video conference software license issued to an internal device user within the organization. Using the same license or different video conference software licenses, portions of the video conference session between an external device user external to the organization and various internal device users within the organization are facilitated. The video conference session remains active regardless of whether a video conference software license is detected. In the event no such license is detected at a given time during the video conference session, the external device user is moved to a virtual waiting room space associated with the video conference session until such a license is detected, such as by the connection of a licensed internal device user to the video conference session or a presentation of a license for use with the video conference session.

20 Claims, 8 Drawing Sheets

LICENSE-BASED VIDEO CONFERENCE SESSION FACILITATION

FIELD

This disclosure generally relates to facilitating a video conference session between device users external and internal to an organization using video conference software licenses.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
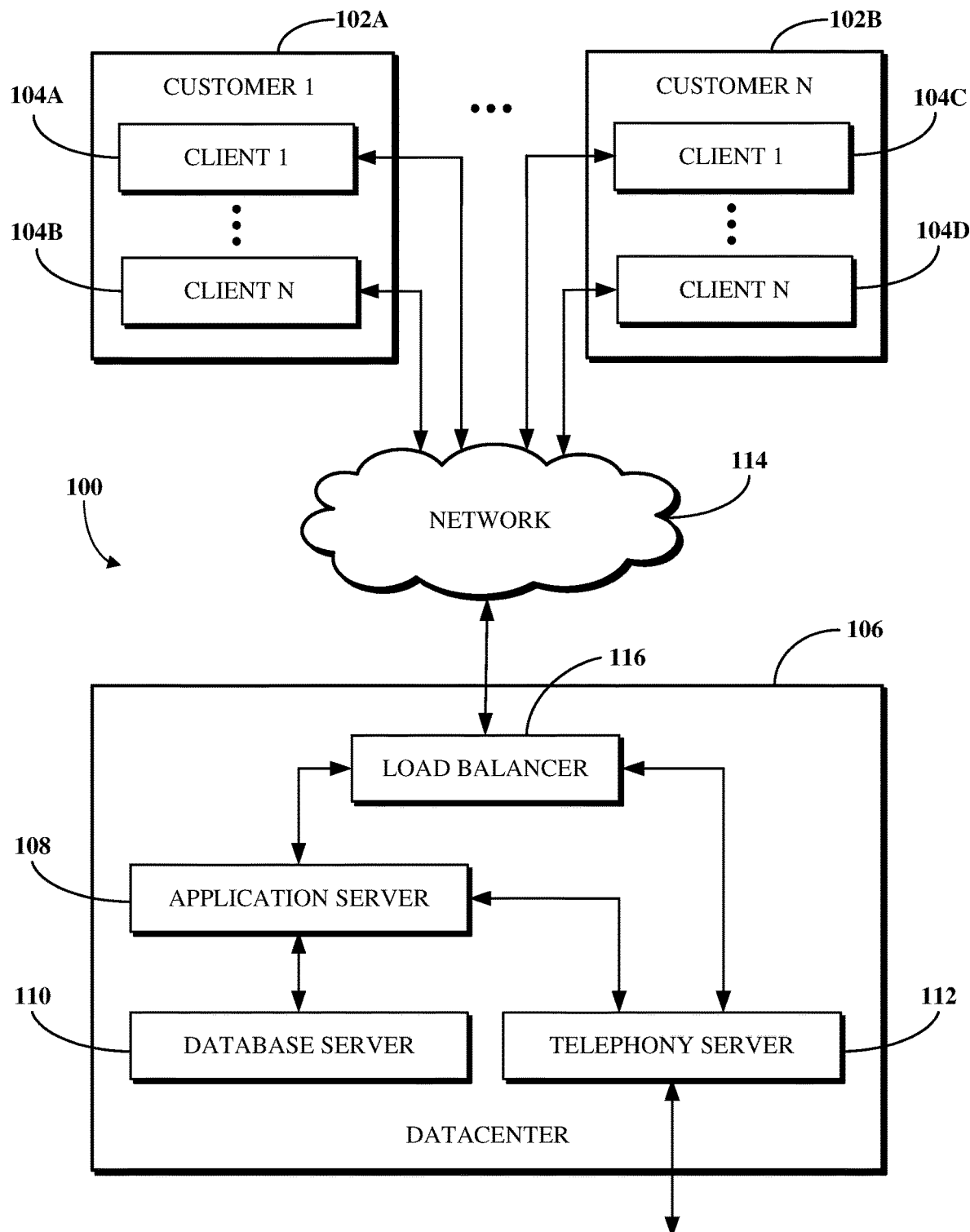
FIG. 1 is a block diagram of an example of an electronic computing and communications system.

Conferencing software is frequently used across various industries to support video-enabled conferences, hereafter referred to as video conferences, between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

Conventional video conferencing involves a host scheduling a video conference and inviting other participants, whether within or external to their organization, to attend. Generally, in situations where a prospective video conference participant external to the organization of the host plans to meet with multiple other participants one by one or otherwise in groups, multiple video conferences must be scheduled. For example, where a job candidate is scheduled to have interviews with multiple employees of an organization, each of those multiple employees may schedule, or have scheduled on their behalf, their own separate video conference for the job candidate to meet with them. The job candidate would then navigate between each of the different video conferences to attend the interviews in separate video conference sessions initiated and terminated according to their individually scheduled time slots. The technical approach for using separate video conferences for different participants or groups thereof is by design within conventional video conferencing services, due, for example, to licensing requirements for authenticating that the participants have rights to host and use the subject video conferences. However, this technical approach can be cumbersome for conference participants external to the host organization, who must maintain and use a series of links each associated with a different video conference to navigate between video conference sessions.

Furthermore, conventional video conferencing services require that either the host who scheduled the video conference or another participant, designated with host privileges and having their own license for the video conferencing service, be present at all times to maintain the video conference session. For example, if the original host is unavailable to attend a given video conference session or leaves before it is over, the host may promote another participant to the host role. However, if there are no participants with licenses for the video conferencing service, the video conference service terminates the video conference session, for example, to prevent unlicensed users from exploiting the software service without authorization. In such a case, a participant external to the host organization will be disconnected (e.g., removed) from the video conference session as the video conference session terminates. The external participant must then to reconnect to the video conference session, but is generally unable to do so until a licensed participant from the host organization returns to restart it. This process, caused by the technical approach underlying the conferencing service design, can result in significant disruption to the video conference experience.

Implementations of this disclosure address problems such as these by refocusing a video conference session around one or more participants external to a host organization, hereafter referred to as external device users, rather than around the licensed participants within the host organization, hereafter referred to as internal device users. In particular, the implementations of this disclosure address a single video conference session being enabled for access by one or more external device users and one or more internal device users in which different portions of the video conference session are facilitated based on video conference software licenses available for use with those portions of the video conference session. The one or more external device users remain connected to the video conference session as ones of the internal device users connect thereto and disconnect therefrom.

According to the implementations of this disclosure, some number of internal device users may be invited to a video conference session, to attend at different times. The external device user connects to the video conference session via a single uniform resource locator or other connection element and remains connected to the video conference session while the various internal device users enter and exit the video conference session at different times, potentially overlapping each other. For example, a first internal device user may be invited to attend the first thirty minutes of the video conference session, a second internal device user may be invited to attend the next thirty minutes thereof, and so forth. Some of the internal device users may have video conference software licenses issued to them and others may not. In the event no internal device user to whom a license is issued remains connected to the video conference session, the external device user is moved to a virtual waiting room of the video conference session without being disconnected from the video conference session. In this way, the external device user can be returned to a virtual conference space at which the participants actually interact once a licensed internal device user connects to the video conference session. The internal device user leading a given portion of the video conference session is given host privileges to enable their full control over their portion of the video conference session. Using this license-based approach for video conferencing, an internal device user may schedule as many video conferences as they want using their own video conference software license, and, as long as an internal device user with a license is present in each, those video conferences can be simultaneously active.

To describe some implementations in greater detail, reference is first made to examples of hardware and software structures used to implement a system for facilitating a video conference session. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
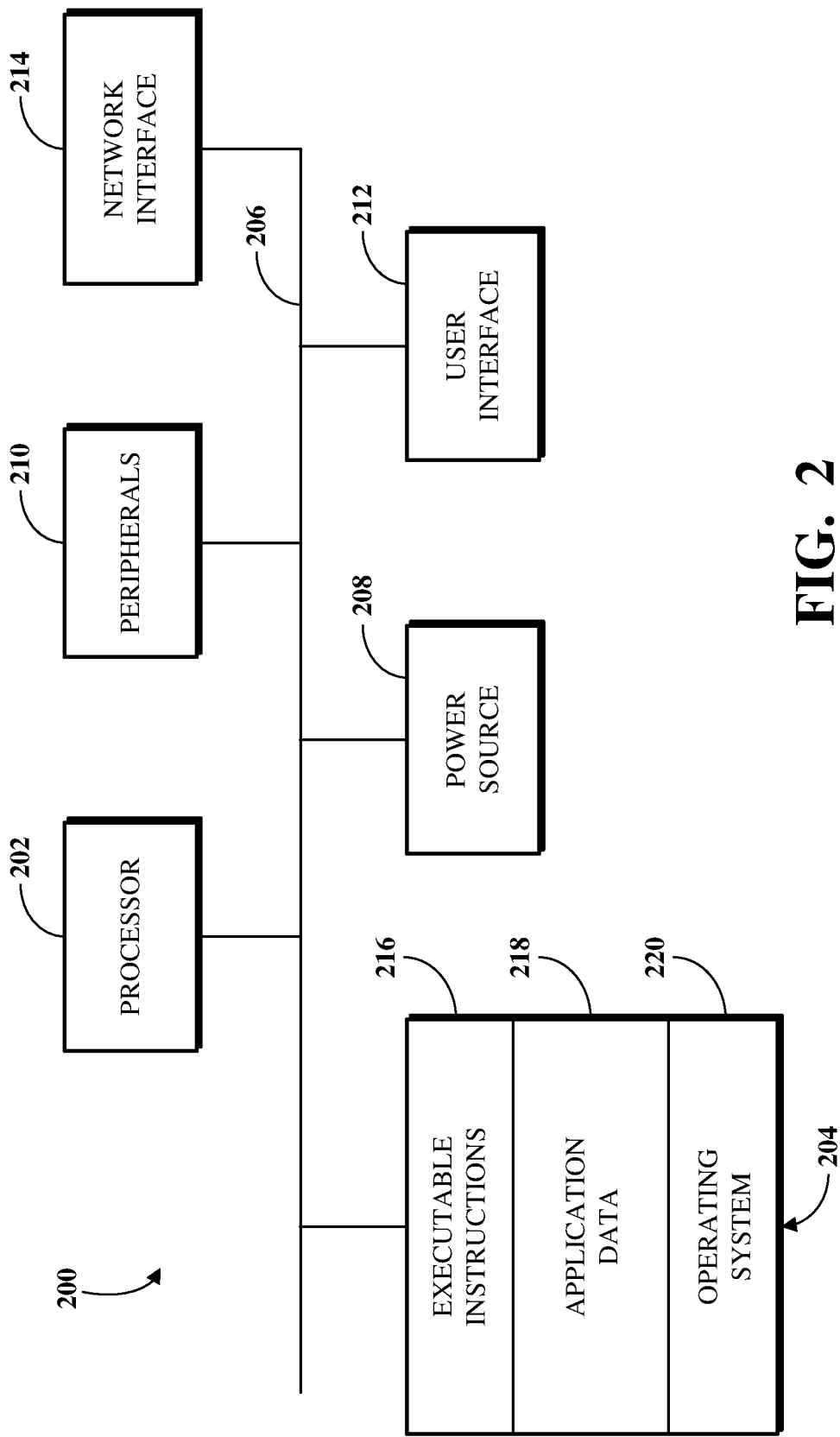
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
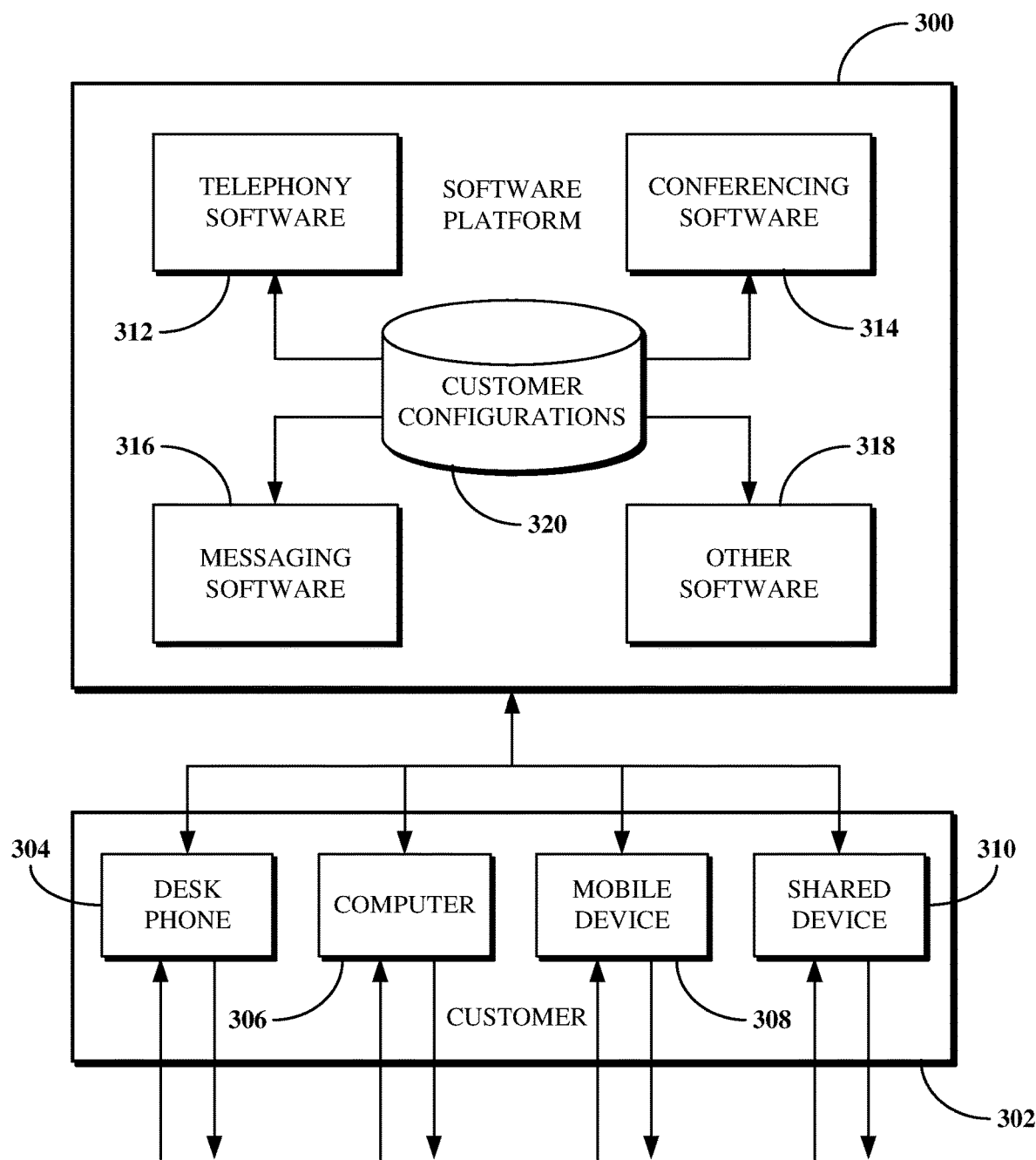
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include license-based video conference session facilitation software. In some such cases, the other software 318 may be or be included in the conferencing software 314.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
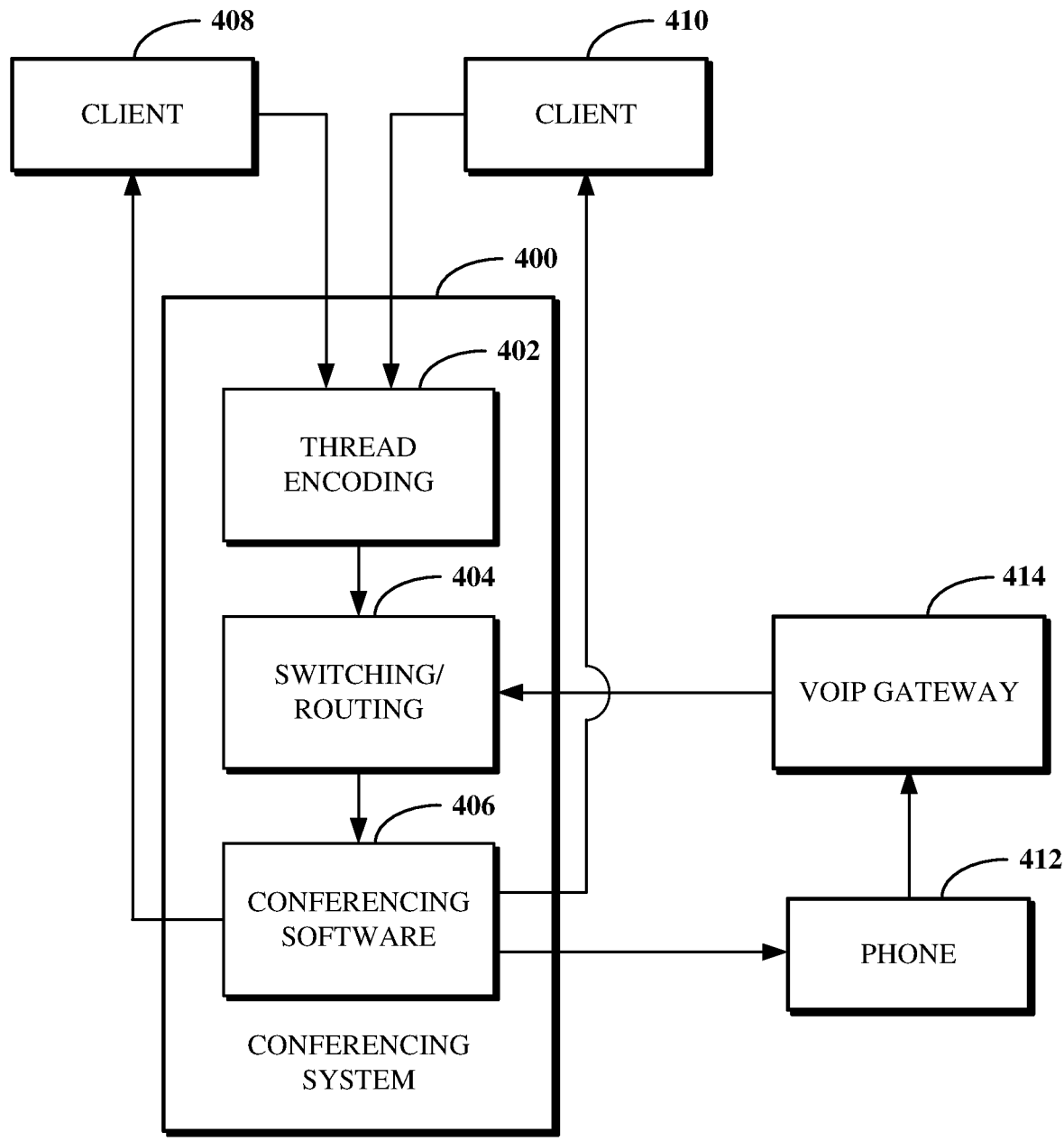
FIG. 4 is a block diagram of an example of a conferencing system.

FIG. 4 is a block diagram of an example of a conferencing system 400, for example, for delivering conferencing software services in an electronic computing and communications system (e.g., the system 100 shown in FIG. 1). The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

The conferencing system 400 may be used to implement a video conference in any of a variety of possible use cases. For example, the conferencing system 400 can implement a participant-to-participant video conference in which participants as end users of the conferencing software 406 may have their own user interface tiles and video streams, connect from their own participant devices (e.g., the client 408 or the client 410), have similar meeting controls, be or be granted host privileges, or the like. A participant-to-participant video conference as referred to herein may thus be recognized as a conventional video conference between two or more given people. In another example, the conferencing system 400 can implement a contact center engagement video conference in which one participant to the video conference is a contact center user who is accessing a contact center over a video modality facilitated wholly or partially using the conferencing software 406 and another participant to the video conference is a contact center agent who works with or otherwise for the contact center to address queries from contact center users. In some such cases, the conferencing system 400 may be implemented within a contact center service to deliver real-time communications over a video modality of the contact center. In yet another example, the conferencing system 400 can implement an online learning video conference in which multiple participants are recognized generally as audience participants and one or more select participants are recognized generally as leader participants. An online learning video conference may, for example, be used for educational purposes (e.g., virtual classes for online-capable schools), webinar purposes, or other lecture- or presentation-type purposes. Other examples of video conferences implementable using the conferencing system 400 are possible.

In some implementations, other software services may be accessible in connection with a conference implemented using the conferencing system 400. For example, a conference may include or otherwise integrate functionality for instant messaging, unified messaging, and other types of messaging communications between participants of the conference, such as to facilitate a chat or like virtual conversation between users of those participants. Those other software services may be implemented at the conferencing system 400 and/or a different aspect of the system 100.

Figure 5:
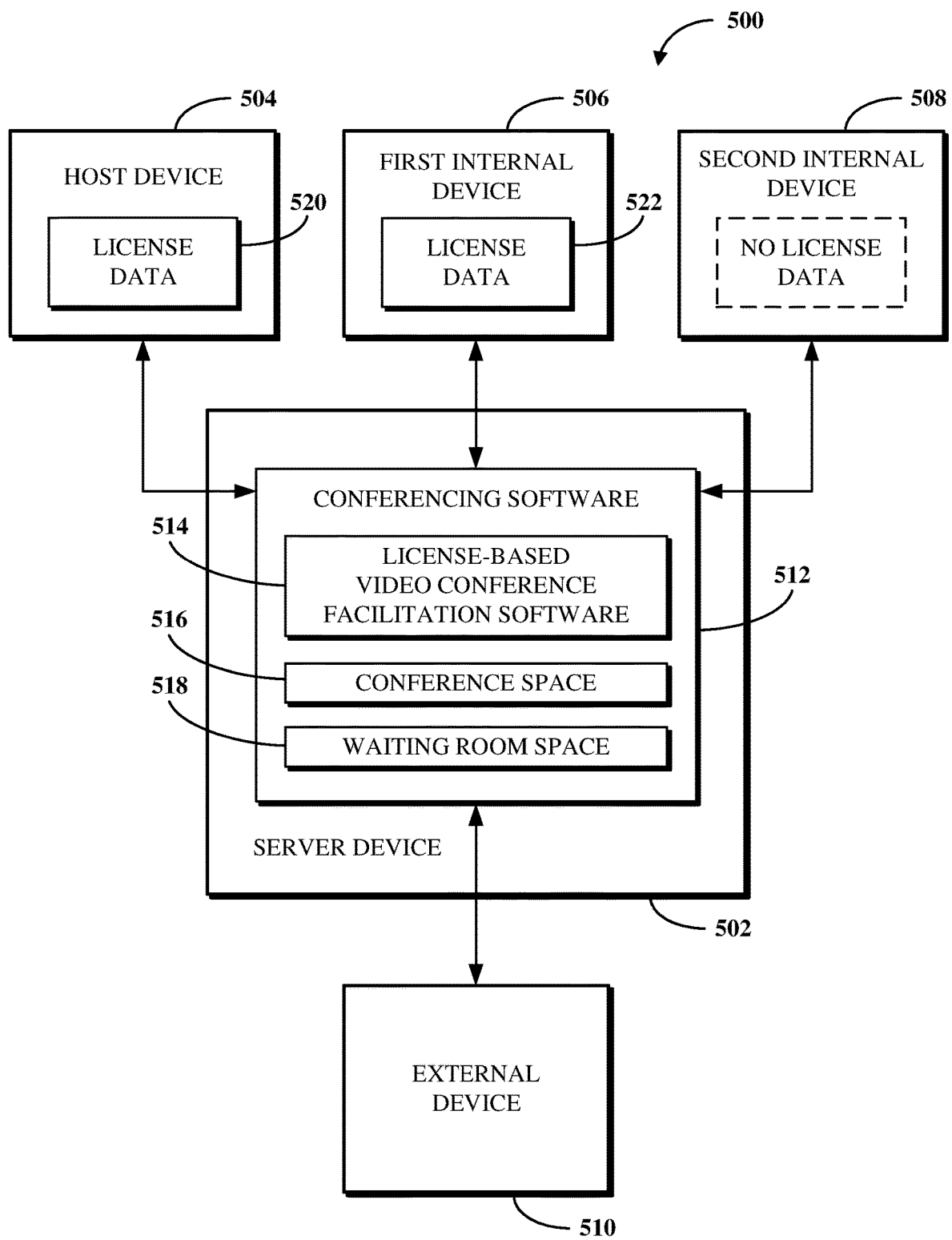
FIG. 5 is a block diagram of an example of a system for license-based video conference session facilitation.

FIG. 5 is a block diagram of an example of a system 500 for license-based video conference session facilitation. The system includes a server device 502, a host device 504, a first internal device 506, a second internal device 508, and an external device 510. The devices 504 through 510 are devices used by conference participants to connect to and participate in a video conference session implemented by conferencing software 512 (e.g., the conferencing software 314 shown in FIG. 3) at the server device 502. Each of the devices 504 through 510 may, for example, be one of the clients 408 or 410 shown in FIG. 4. For example, the devices 504 through 510, in approaches where they are clients, may access a video conference implemented by the conferencing software 512 using client applications running at those devices. In some cases, one or more of the devices 504 through 510 (e.g., the external device 510) may be other than a client. For example, the external device 510 may access a video conference by the conferencing software 512 using a web browser running at the external device 510 where the external device 510 does not include a client application. While a particular number of such devices are shown as connecting to a video conference session implemented by the conferencing software 512 in a non-limiting example, in some implementations, other numbers of devices may be so connected.

The conferencing software 512 includes or otherwise uses license-based video conference facilitation software 514 to facilitate a video conference session between users of ones of the devices 504 through 510. In particular, the license-based video conference facilitation software 514 facilitates portions of a video conference session between users of ones of the devices 504 through 510 using video conference software licenses issued to one or more internal device users. Using the license-based video conference facilitation software 514, the conferencing software 512 can enable a single video conference session to which different internal device users (e.g., users of the host device 504, the first internal device 506, and/or the second internal device 508) can connect at different times without requiring that external device users (e.g., the user of the external device 510) disconnect from one video conference session and reconnect to another to which a next internal device user has host privileges.

The conferencing software 512 implements a video conference space 516 and a virtual waiting room space 518. The video conference space 516 is an instance of the conferencing software 512 at which the internal device users and external device users actually interact with one another. The video conference space 516 includes a user interface for outputting media from internal device users and/or external device users and for providing various controls to one or more of the internal device users and/or external device users (e.g., for a designated host to control the video conference session). The virtual waiting room space 518 is a virtual space associated with the video conference space 516 which serves as a separate area at which external device users may be while connected to the video conference session, such as when first connecting to the video conference session. In particular, external device users may be moved from the video conference space 516 to the virtual waiting room space 518 when no video conference software license is detected by the license-based video conference facilitation software 514.

Figure 6:
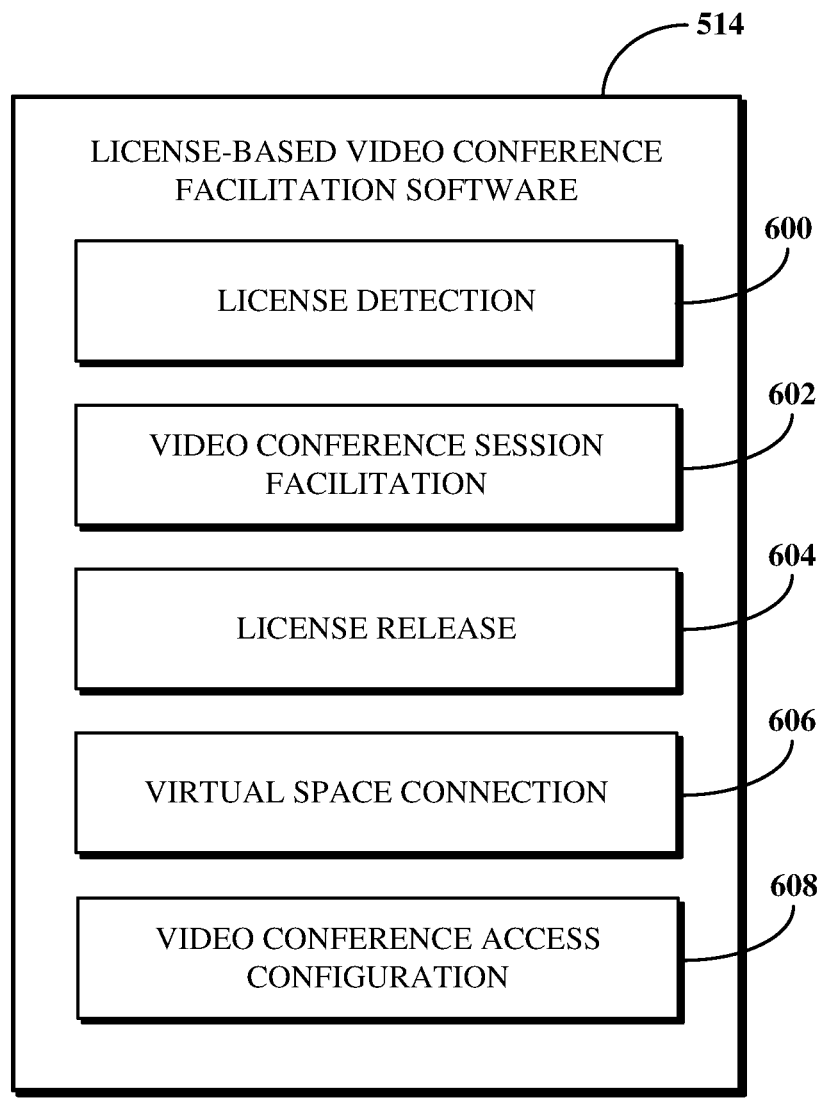
FIG. 6 is a block diagram of an example of functionality of license-based video conference session facilitation software.

The license-based video conference facilitation software 514 will be further described with reference to FIGS. 5 and 6. FIG. 6 shows a block diagram of an example of functionality of the license-based video conference facilitation software 514. The license-based video conference facilitation software 514 includes tools, such as programs, subprograms, functions, routines, subroutines, operations, and/or the like, for facilitating a video conference session using one or more video conference software licenses issued to one or more internal device users. As shown, the license-based video conference facilitation software 514 includes a license detection tool 600, a video conference session facilitation tool 602, a license release tool 604, a virtual space connection tool 606, and a video conference access configuration tool 608.

The license detection tool 600 detects licenses issued to internal device users connected to or otherwise associated with a video conference session implemented using the conferencing software 512. A license may be issued to an internal device user as part of a subscription or like process for a conferencing or like service associated with the conferencing software 512. For example, the license may be a license to access some or all functionality of a UCaaS platform, such as the software platform 300 shown in FIG. 3. The license detection tool 600 detects licenses issued to internal device users using license data, for example, the license data 520 and the license data 522 shown in FIG. 5. The license data used to detect a license issued to an internal device user may be data stored at or otherwise accessible from an internal device and indicative of an active video conference software license issued for use with the internal device. For example, the license data 520 and the license data 522 may refer to data stored at the host device 504 and the first internal device 506, respectively, such as public or private key information, other encoded or encrypted information stored as a hashed or plaintext value, or the like.

The license detection tool 600 may detect the license data by transmitting a background request for the license data to some or all of the internal devices connected to the conferencing software 512. The request can, for example, be transmitted to an internal device upon the internal device connecting to the conferencing software 512 to join a subject video conference session. Alternatively, the internal device may be configured to automatically transmit any license data stored at the internal device upon an event occurrence, for example, the internal device connecting to the conferencing software 512 to join a subject video conference session. The license detection tool 600 can process the license data either independent of other data or in connection with other data to detect a license from the subject internal device. For example, the license detection tool 600 can compare the license data against server-side data indicative of licenses issued to internal device users to verify that the license data corresponds to an active video conference software license. In another example, the license detection tool 600 can process (e.g., decode or decrypt) the license data to determine based on the license data alone that the license data corresponds to an active video conference software license.

The license detection tool 600 may detect, as a license issued to an internal device user and usable for the video conference session, a video conference software license issued to a host who schedules the video conference session regardless of whether the host is at any point connected to the video conference session. For example, the user of the host device 504 may schedule the subject video conference session without an intention to participate therein. In such a case, the license detection tool 600 may detect the license data 520 in a manner as described above and use same to detect a video conference software license issued to the user of the host device 504 and available for use with the video conference session.

Video conference software licenses may be issued to internal device users at an organization-level or at a team-level. For example, the internal device users to whom licenses are issued and may be used with the video conference session may correspond to the same organization or, in some cases, to the same team within an organization. Video conference software licenses detected for use with the video conference session, whether issued to internal device users connected to the video conference session or internal device users not connected to but still associated with the video conference session (e.g., a scheduling host), may be considered as being presented for use with the video conference session regardless of whether the internal device user associated with such a license directly, actively, or otherwise intentionally makes such license available to the video conference session. For example, a license detected using the license data 520 may be deemed to have been presented for use with the video conference session based on the user of the host device 504 scheduling the video conference session using that license. In another example, a license detected using the license data 522 may be deemed to have been presented for use with the video conference session based on the user of the first internal device 506 connecting the video conference session.

Despite this, the conferencing software 512 (e.g., via the license-based video conference facilitation software 514) may enforce a policy limiting presentation of a given video conference software license for use with one video conference session at a time. Thus, licenses identified by detecting license data such as the license data 520 and the license data 522 may be presented for use with the video conference session only where those licenses are not already presented for use with a different video conference session. Accordingly, as part of the license detection process, the license detection tool 600 determines whether a license is already presented for use with another video conference session occurring during the video conference session. For example, server-side data associated with a detected license may be updated upon the license being presented for use with a video conference session to indicate such use. In such a case, the license detection tool 600, upon detecting a license, may check such server-side data to determine whether the license is already presented for use with a video conference session. If a license is not determined to already be presented for use with a video conference session, it is considered available and thus may be presented for use with the subject video conference session. If a license is determined to already be presented for use with a video conference session, it is considered unavailable and thus may not also be presented for use with the subject video conference session.

The video conference session facilitation tool 602 facilitates a video conference session using licenses available and detected by or otherwise using the license detection tool 600. In particular, the video conference session facilitation tool 602 facilitates portions of a video conference session. A portion of a video conference session may be facilitated by or otherwise using the video conference session facilitation tool 602 so long as at least one license presented for use with the video conference session is detected by or otherwise using the license detection tool 600. Portions of a video conference session facilitated by or otherwise using the video conference session facilitation tool 602 may but need not be segmented, structured, or otherwise identified separate from one another. For example, a first portion of a video conference session may simply refer to a period of time during which a first set of one or more internal device users is connected to the video conference session and a second portion thereof may simply refer to a next period of time during which a second set of one or more internal device users (whether partially or non-overlapping with the first set of one or more internal device users) is connected thereto. In such a case, there may be no actual definition of when one portion ends and another begins. In another example, a first portion of a video conference session may refer to the first N (e.g., thirty or sixty) minutes of the video conference session and a second portion thereof may simply refer to the next N minutes thereof. In such a case, defined time periods may be used to identify when one portion ends and when another begins.

In one example, a video conference may be scheduled by a user of the host device 504 using license data 520 representative of a video conference software license issued to an internal device user associated with the host device 504. The internal device users associated with the first internal device 506 and the second internal device 508 and the external device user associated with the external device 510 may be invited to the video conference by or on behalf of the internal device user associated with the host device

504. The video conference session for the video conference is enabled by the conferencing software 512 instantiating the video conference space 516, for example, upon a request from one or more of the devices 504 through 510 to connect to the video conference session (e.g., via a uniform resource locator within a calendar event item or email message). In this example, the host device 504 connects to the video conference session first, followed closely by the external device 510. The license-based video conference facilitation software detects a license issued to the internal device user associated with the host device 504 based on the license data 520 to facilitate a first portion of the video conference session during which both the internal device user associated with the host device 504 and the external device user associated with the external device 510 interact within the video conference space 516. At some point thereafter, an internal device user associated with the first internal device 506 connects to the video conference session, and the license-based video conference facilitation software 514 detects a license issued to that internal device user based on the license data 522. The host device disconnects 504 from the video conference session after the first internal device 506 connects thereto and withdraws the license data 520 from use with the video conference session. Because a license issued to an internal device user is still detected (i.e., based on the license data 522), the second portion of the video conference session can still be facilitated between the external device user and the internal device user associated with the first internal device 506, even though the license issued to the internal device user associated with the host device is no longer presented for use with the video conference session.

The license release tool 604 releases licenses used with a video conference session. Releasing a license used with a video conference session includes withdrawing the license from use with the video conference session, such as to enable presentation of that license for use with a different (e.g., concurrent) video conference session. In particular, the license release tool 604 may release a license based on a request from an internal device associated with an internal device user to whom the license is issued, a request from another internal device user associated with the video conference session, or a determination to release the license without a request to do so being provided. For example, the internal device user to whom the license is issued may request a release of their license so they can use the license to schedule or participate in another video conference session. In another example, an internal device user other than the one to whom the license is issued may request a release of the license because the license of the requesting internal device user is available and presented for use with the video conference session. In yet another example, the license release tool 604 can, without manual user intervention, determine one or more licenses currently presented for use with the video conference session to release based on one or more of a number of licenses currently presented for use with the video conference session, the internal device user or users associated with the one or more licenses, a number of video conferences with which the internal device user or users are associated, or another factor.

To determine a video conference software license to release, the license release tool 604 evaluates the number of licenses presented for use with the video conference session and the internal device users associated with those licenses. For example, the license release tool 604 may determine to release one or more licenses based on a determination that there are more than a threshold number of licenses presented for use with the video conference. The particular one or more licenses to release may, for example, be selected based on the internal device users to whom they are issued not being connected to the video conference session. In some cases, a minimum license policy may be enforced to prevent the license release tool 604 from releasing licenses that would cause the total number of licenses presented for use with the video conference session to be below a threshold (e.g., two). This may, for example, provide for a back-up license in the event that one license presented for use with the video conference session is released by the internal device user to whom it is issued.

The virtual space connection tool 606 connects virtual spaces associated with a video conference session, for example, the video conference space 516 and the virtual waiting room space 518. In particular, the virtual space connection tool 606 facilitates movements of external device users connected to the video conference session between the video conference space 516 and the virtual waiting room space 518. As described above, an external device user may be moved from the video conference space 516 to the virtual waiting room space 518 based on a determination that there are no internal device users to whom video conference software licenses are issued connected to the video conference session at a given time. Thus, an external device user may be moved from the video conference space 516 to the virtual waiting room space 518 where the license detection tool 600 does not detect a license available for presentation to the video conference session. The virtual space connection tool 606 may further move an external device user from the virtual waiting room space 518 to the video conference space 516 based on a determination (e.g., by or using the license detection tool 600) that there is at least one license available for presentation to the video conference session, for example, because at least one internal device user to whom a license is issued is connected to the video conference session. The virtual space connection tool 606 may in some cases also control a selection of content, or otherwise make a selection of content available, for output to the device of the external device user while the external device user is in the virtual waiting room space 518. For example, the virtual space connection tool 606 may cause one or more images or videos to be output for display to the external device users in the virtual waiting room space 518. In another example, the virtual space connection tool 606 may present a survey to be filled out by the external device users in the virtual waiting space 518. In yet another example, the virtual space connection tool 606 enable integrations between the virtual waiting room space 518 and one or more third party applications to expose the external device users to content via those third party applications.

The video conference access configuration tool 608 enables and/or disables access to various functionality of otherwise associated with the video conference session. In one example, the video conference access configuration tool 608 may enable some or all participants (e.g., internal device users only or internal device users and external device users) to access recording of the video conference session without the host sharing the recording. In another example, the video conference access configuration tool 608 can change (e.g., update, such as by adding or removing) functionality of the video conference session during the video conference session. For example, upon a threshold number of video conference software licenses being detected, the video conference access configuration tool 608 may enable certain video conference functionality (e.g., whiteboarding). In some cases, the enabled functionality may be disabled upon the number of video conference software licenses detected going back below the threshold. In another example, certain types of participants being present (e.g., panelists at a lecture-type webinar video conference session or a hiring manager and a compensation manager at a video conference session used for a job interview), the video conference access configuration tool 608 may enable functionality specific to those participant roles.

Although the tools 600 through 608 are shown as separate tools, in some implementations, two or more of the tools 600 through 608 may be combined into a single tool. Although the tools 600 through 608 are shown as functionality of the license-based video conference facilitation software 514 as a single piece of software, in some implementations, some or all of the tools 600 through 608 may exist outside of the license-based video conference facilitation software 514. Similarly, in some implementations, a software service using the license-based video conference facilitation software 514 (e.g., the conferencing software 512) may exclude the license-based video conference facilitation software 514 while still including the some or all of tools 600 through 608 in some form elsewhere or otherwise make use of the tools 600 through 608 while some or all of the tools 600 through 608 are included in some form elsewhere. Similarly, while the license-based video conference facilitation software 514 is shown and described as being included within the conferencing software 512, in some implementations, the license-based video conference facilitation software 514 or a portion thereof may be external to the conferencing software 512. For example, the license-based video conference facilitation software 514 may in some cases represent functionality of a software platform which includes the conferencing software 512 (e.g., the software platform 300 shown in FIG. 3) external to but otherwise for use with the conferencing software 512. In another example, the license-based video conference facilitation software 514 may be implemented at a user device internal to the host organization, such as one of the devices 504 through 508.

Example use cases are now described with reference to FIGS. 5-6. In a first example use case, a video conference session is scheduled for a candidate interviewing for a job with an organization. The candidate is the external device user using the external device 510 and the interviewers, who are employees of the organization, are the internal device users using the host device 504, the first internal device 506, and the second internal device 508. The candidate is provided with a single uniform resource locator including the address at which to connect to the video conference session, scheduled by the user of the host device 504. The user of the host device 504 connects to the video conference session using a video conference software license detected using the license data 520, followed closely by the user of the external device 510. The user of the host device 504 spends the first portion of the video conference interviewing the external device user. At some point thereafter, the user of the first internal device 506 connects to the video conference session and a video conference software license issued to that user is detected using the license data 522. There are thus two video conference software licenses presented for use with the video conference session. The user of the host device 504 disconnects from the video conference session after the user of the first internal device 506 connects thereto, to allow the user of the first internal device 506 to lead the second portion of the interview with the external device user. However, the user of the host device 504 does not request a release of their license, so both licenses remain presented for use with the video conference session. At some point thereafter, the user of the second internal device 508 connects to the video conference session. The user of the second internal device 508 does not have a video conference software license issued to them, as indicated by the lack of license data of the second internal device 508. The user of the first internal device 506 disconnects from the video conference session after the user of the second internal device 508 connects thereto and requests a release of their license. However, because the license issued to the user of the host device 504 remains presented for use with the video conference session, there is at least one license available and thus the external device user remains within the video conference space 516 (i.e., rather than being moved to the virtual waiting room space 518). The interview ends once the third portion facilitated for the external device user and the user of the second internal device 508 ends. Throughout the video conference session, the only participant to remain connected the entire time is the external device user, but there is always at least one license presented for use.

In a second example use case, the user of the external device 510 is a customer of a contact center and the users of the host device 504 and the first internal device 506 are employees of the contact center. For example, the user of the host device 504 may be a contact center agent to whom a query initiated by the customer is routed for handling over a video conference modality and the user of the first internal device 506 may be a contact center agent supervisor who supervises the contact center agent. During the video conference, the external device user asks the contact center agent for help with a problem. Because the resolution to the problem requires action by a contact center agent supervisor, the contact center agent transmits, from their device, a request for the contact center agent supervisor to connect to the video conference. Upon the connection of the contact center agent supervisor to the video conference, and because they have the role of contact center agent supervisor, functionality of the video conference is changed to introduce a control for the contact center agent supervisor to execute a workflow otherwise inaccessible to the contact center agent alone (e.g., based on the license issued to the contact center agent) to directly address the problem from the customer.

In a third example use case, members of an organization can create an aggregate demand for a virtual space at which they may connect whether for professional or social purposes. The virtual space is a video conference session that persists over time and enables anyone with a license to cause the video conference space 516 associated therewith to be instantiated. Device users without licenses (e.g., new hires or junior members of the organization) may wait in the virtual waiting room space 518 until a license is presented for use with the video conference session.

Figure 7:
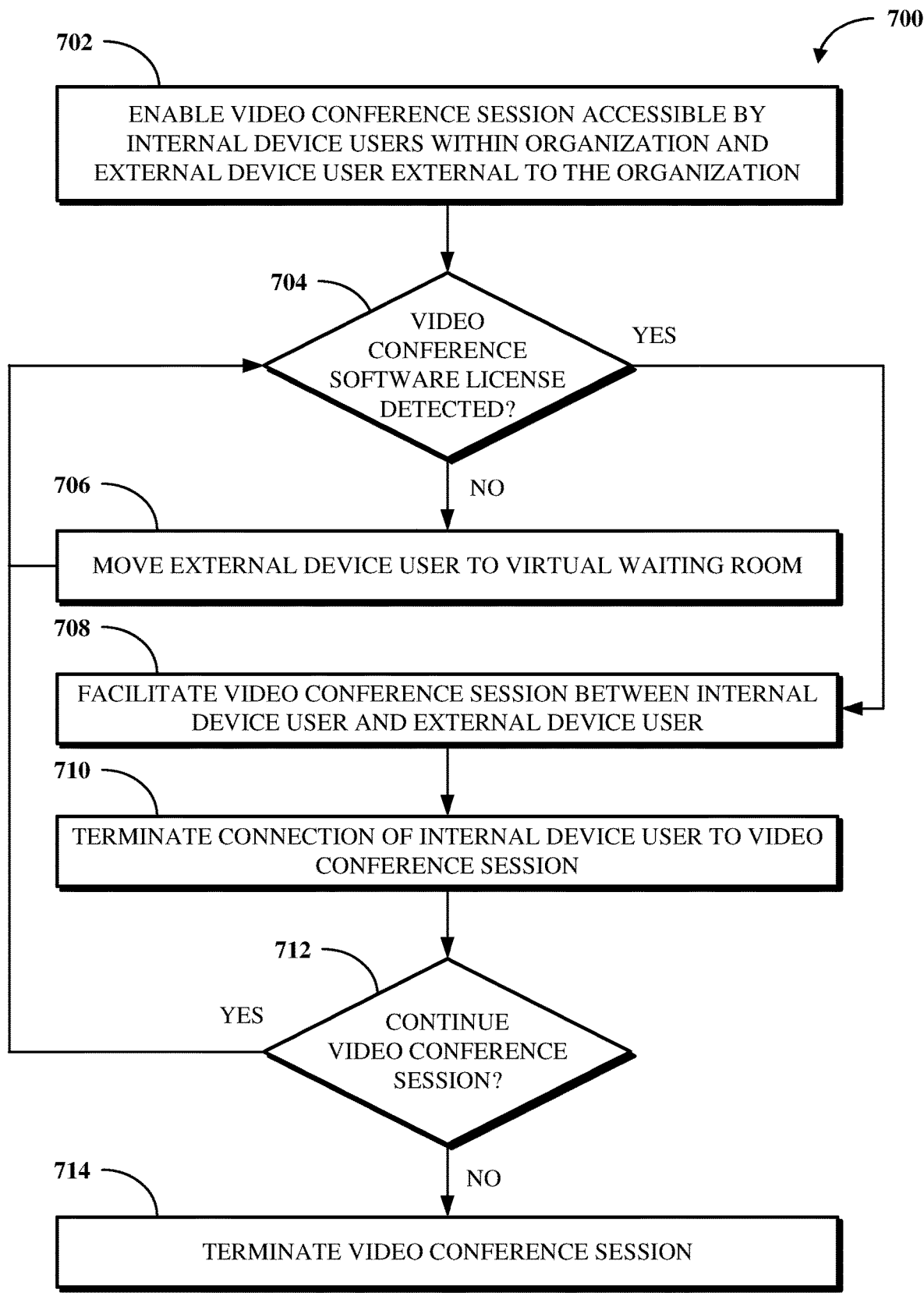
FIG. 7 is a flowchart of an example of a technique for facilitating a video conference session using video conference software licenses issued to internal device users.
Figure 8:
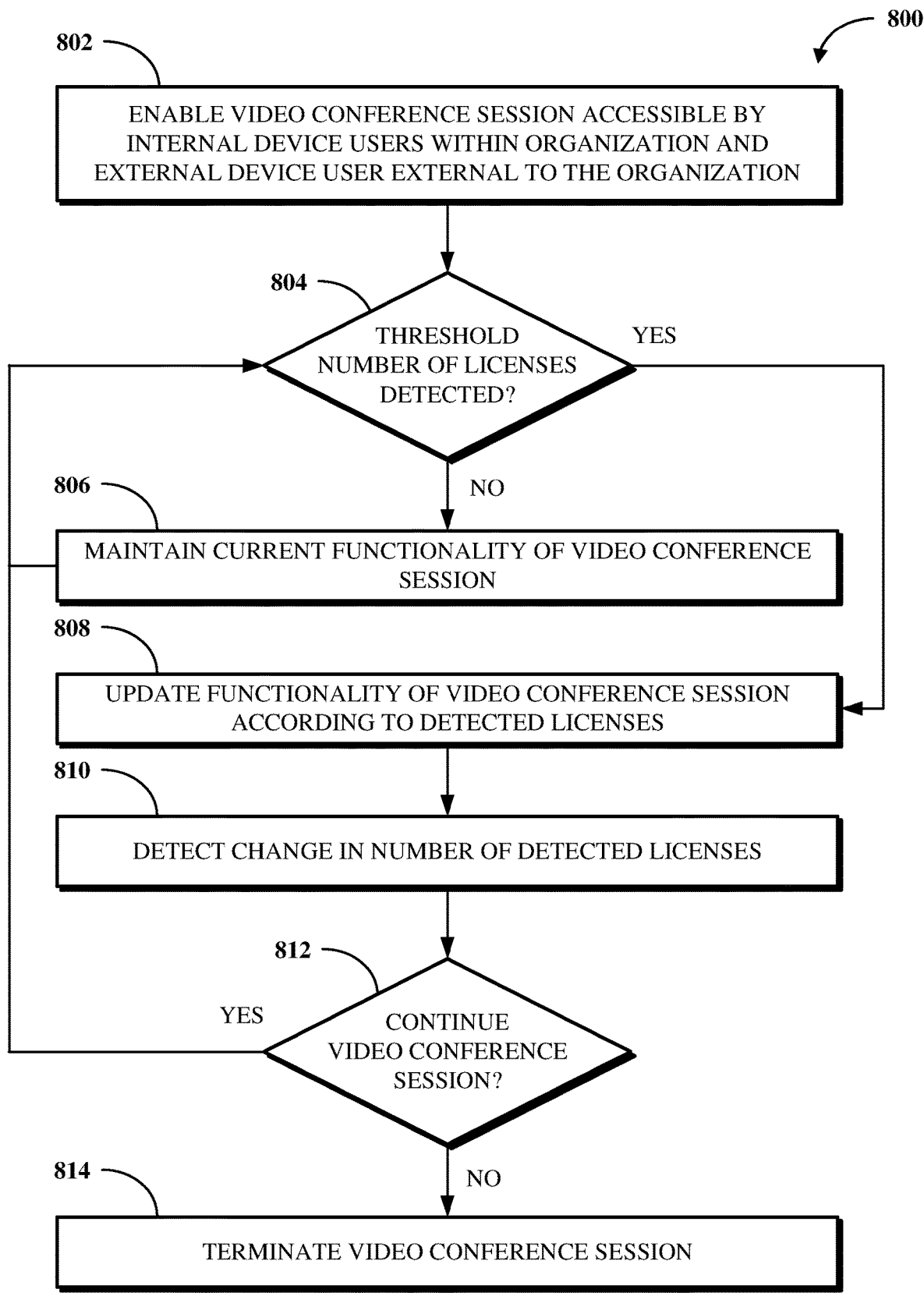
FIG. 8 is a flowchart of an example of a technique for updating functionality of a video conference session according to a number of detected video conference software licenses.

To further describe some implementations in greater detail, reference is next made to examples of techniques which may be performed by or using a system for facilitating a video conference session. FIG. 7 is a flowchart of an example of a technique 700 for facilitating a video conference session using video conference software licenses issued to internal device users. FIG. 8 is a flowchart of an example of a technique 800 for updating functionality of a video conference session according to a number of detected video conference software licenses.

The technique 700 and/or the technique 800 can be executed using computing devices, such as the systems, hardware, and software described with respect to FIGS. 1-7C. The technique 700 and/or the technique 800 can be performed, for example, by executing a machine-readable program or other computer-executable instructions, such as routines, instructions, programs, or other code. The steps, or operations, of the technique 700, the technique 800, and/or another technique, method, process, or algorithm described in connection with the implementations disclosed herein can be implemented directly in hardware, firmware, software executed by hardware, circuitry, or a combination thereof.

For simplicity of explanation, the technique 700 and the technique 800 are each depicted and described herein as a series of steps or operations. However, the steps or operations of the technique 700 and/or the technique 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, a flowchart of an example of the technique 700 for facilitating a video conference session using video conference software licenses issued to internal device users is shown. At 702, a video conference session is enabled. The video conference session is accessible by internal device users within an organization and an external device user external to the organization.

At 704, a determination is made as to whether a video conference software license is detected. At 706, responsive to a determination that no video conference software license is detected, the external device user is moved to a virtual waiting room associated with the video conference session. The technique 700 then returns to 704 to periodically or on an event-basis repeat the determination as to whether a video conference software license is detected.

At 708, responsive to a determination that a video conference software license is detected, the video conference session is facilitated between one or more internal device users and the external device user. At 710, the connection of the internal device user to the video conference session is terminated.

At 712, a determination is made as to whether or not to continue the video conference session. For example, the determination can be made based on whether a time period for the video conference session (e.g., as scheduled) has elapsed. In another example, the determination can be made based on whether an internal device user has indicated terminate the video conference session. At 714, responsive to a determination not to continue the video conference session, the video conference session is terminated. However, responsive to a determination to continue the video conference session, the technique 700 returns to 704.

Referring next to FIG. 8, a flowchart of an example of the technique 800 for updating functionality of a video conference session according to a number of detected video conference software licenses is shown. At 802, a video conference session is enabled. The video conference session is accessible by internal device users within an organization and an external device user external to the organization.

At 804, a determination is made as to whether a threshold number of video conference software license is detected. At 806, responsive to a determination that the threshold number of video conference software licenses is not detected, the current functionality of the video conference session is maintained. The technique 800 then returns to 804 to periodically or on an event-basis repeat the determination as to whether a threshold number of video conference software licenses is detected.

At 808, responsive to a determination that a threshold number of video conference software licenses is detected, the functionality of the video conference session is updated according to the detected licenses. For example, the detected licenses may be indicative of the internal device users to whom they are issued or otherwise of the roles of those internal device users relative to the organization and/or the video conference session.

At 810, a change in the number of detected video conference software licenses presented for use with the video conference session is detected. For example, the change in the number of detected video conference software licenses may be based on one or more internal device users connecting to or disconnecting from the video conference session. In another example, the change in the number of detected video conference software licenses may be made based on a determination to release one or more video conference software licenses from use with the video conference session.

At 812, a determination is made as to whether or not to continue the video conference session. For example, the determination can be made based on whether a time period for the video conference session (e.g., as scheduled) has elapsed. In another example, the determination can be made based on whether an internal device user has indicated terminate the video conference session. At 814, responsive to a determination not to continue the video conference session, the video conference session is terminated. However, responsive to a determination to continue the video conference session, the technique 800 returns to 804.

The implementations of this disclosure correspond to methods, non-transitory computer readable media, apparatuses, systems, devices, and the like. In some implementations, a method comprises: enabling a video conference session accessible by internal device users within an organization and an external device user external to the organization; facilitating a first portion of the video conference session between the external device user and a first internal device user of the internal device users using a first video conference software license issued to the first internal device user; and facilitating a second portion of the video conference session between the external device user and a second internal device user of the internal device users using a second video conference software license issued to the second internal device user. In some implementations, a non-transitory computer readable medium stores instructions operable to cause one or more processors to perform operations comprising: enabling a video conference session accessible by internal device users within an organization and an external device user external to the organization; facilitating a first portion of the video conference session between the external device user and a first internal device user of the internal device users using a first video conference software license issued to the first internal device user; and facilitating a second portion of the video conference session between the external device user and a second internal device user of the internal device users using a second video conference software license issued to the second internal device user. In some implementations, an apparatus comprises a memory and a processor configured to execute instructions stored in the memory to: enable a video conference session accessible by internal device users within an organization and an external device user external to the organization; facilitate a first portion of the video conference session between the external device user and a first internal device user of the internal device users using a first video conference software license issued to the first internal device user; and facilitate a second portion of the video conference session between the external device user and a second internal device user of the internal device users using a second video conference software license issued to the second internal device user.

In some implementations of the method, non-transitory computer readable medium, or apparatus, enabling the video conference session comprises: initiating the video conference session using a third video conference software license issued to a person separate from the internal device users.

In some implementations of the method, non-transitory computer readable medium, or apparatus, the method comprises, the operations comprise, and the processor is configured to execute the instructions for: moving, based on no internal device users with video conference software licenses being connected to the video conference session at a first time, the external device user to a virtual waiting room without disconnecting the external device user from the video conference session; and moving, based on one or more of the internal device users with the video conference software licenses connecting to the video conference session at a second time after the first time, the external device user to a virtual conference space from the virtual waiting room.

In some implementations of the method, non-transitory computer readable medium, or apparatus, the video conference session is enabled using a video conference software license issued to a person within the organization, and the method comprises, the operations comprise, and the processor is configured to execute the instructions for: enabling, using the video conference software license, one or more other video conference sessions to occur concurrently with the video conference session.

In some implementations of the method, non-transitory computer readable medium, or apparatus, facilitating a portion of the video conference session between the external device user and an internal device user of the internal device users using a video conference software license issued to the internal device user comprises: enabling, for the internal device user, host privileges of the video conference session during the portion.

In some implementations of the method, non-transitory computer readable medium, or apparatus, facilitating a portion of the video conference session between the external device user and an internal device user of the internal device users using a video conference software license issued to the internal device user comprises: obtaining a token corresponding to the video conference software license from a device of the internal device user; and authenticating access, via the external device user and the internal device user, to a virtual conference space associated with the video conference session using the token.

In some implementations of the method, non-transitory computer readable medium, or apparatus, the method comprises, the operations comprise, and the processor is configured to execute the instructions for: sharing a recording of the video conference session with the first internal device user and the second internal device user based on the first video conference software license and the second video conference software license.

In some implementations of the method, non-transitory computer readable medium, or apparatus, the video conference session is accessible in its entirety by the external device user via a single uniform resource locator.

In some implementations of the method, non-transitory computer readable medium, or apparatus, the video conference session is enabled using a video conference software license issued to a third internal device user scheduling the video conference session.

In some implementations of the method, non-transitory computer readable medium, or apparatus, the method comprises, the operations comprise, and the processor is configured to execute the instructions for: releasing the first video conference software license upon a beginning of the second portion of the video conference session.

In some implementations of the method, non-transitory computer readable medium, or apparatus, the external device user remains connected to the video conference session even where no video conference software license is detected for use with the video conference session.

In some implementations of the method, non-transitory computer readable medium, or apparatus, the method comprises, the operations comprise, and the processor is configured to execute the instructions for: detecting the first video conference software license in connection with the first portion of the video conference session; and detecting the second video conference software license in connection with the second portion of the video conference session.

In some implementations of the method, non-transitory computer readable medium, or apparatus, multiple video conference software licenses are detected for use with the video conference session, and the method comprises, the operations comprise, and the processor is configured to execute the instructions for: determining one or more of the multiple video conference software licenses to release.

In some implementations of the method, non-transitory computer readable medium, or apparatus, the external device user is moved to a virtual waiting room space associated with the video conference session based on a failure to detect a video conference software license.

In some implementations of the method, non-transitory computer readable medium, or apparatus, the method comprises, the operations comprise, and the processor is configured to execute the instructions for: updating functionality of the video conference session based on a detection of a threshold number of video conference software licenses.

In some implementations of the method, non-transitory computer readable medium, or apparatus, the method comprises, the operations comprise, and the processor is configured to execute the instructions for: detecting the first video conference software license using license data obtained from a device of the first internal device user.

In some implementations of the method, non-transitory computer readable medium, or apparatus, a recording of the video conference session is made accessible to the external device user, the first internal device user, and the second internal device user.

In some implementations of the method, non-transitory computer readable medium, or apparatus, the first video conference software license and the second video conference software license are issued at a team-level within the organization.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   enabling a video conference session accessible by internal device users within an organization and an external device user external to the organization;
   facilitating a first portion of the video conference session between the external device user and a first internal device user of the internal device users using a first video conference software license issued to the first internal device user; and
   facilitating a second portion of the video conference session between the external device user and a second internal device user of the internal device users using a second video conference software license issued to the second internal device user.

2. The method of claim 1, wherein enabling the video conference session comprises:
   initiating the video conference session using a third video conference software license issued to a person separate from the internal device users.

3. The method of claim 1, comprising:
   moving, based on no internal device users with video conference software licenses being connected to the video conference session at a first time, the external device user to a virtual waiting room without disconnecting the external device user from the video conference session; and
   moving, based on one or more of the internal device users with the video conference software licenses connecting to the video conference session at a second time after the first time, the external device user to a virtual conference space from the virtual waiting room.

4. The method of claim 1, wherein the video conference session is enabled using a video conference software license issued to a person within the organization, the method comprising:
   enabling, using the video conference software license, one or more other video conference sessions to occur concurrently with the video conference session.

5. The method of claim 1, wherein facilitating a portion of the video conference session between the external device user and an internal device user of the internal device users using a video conference software license issued to the internal device user comprises:
   enabling, for the internal device user, host privileges of the video conference session during the portion.

6. The method of claim 1, wherein facilitating a portion of the video conference session between the external device user and an internal device user of the internal device users using a video conference software license issued to the internal device user comprises:
   obtaining a token corresponding to the video conference software license from a device of the internal device user; and
   authenticating access, via the external device user and the internal device user, to a virtual conference space associated with the video conference session using the token.

7. The method of claim 1, comprising:
   sharing a recording of the video conference session with the first internal device user and the second internal device user based on the first video conference software license and the second video conference software license.

8. The method of claim 1, wherein the video conference session is accessible in its entirety by the external device user via a single uniform resource locator.

9. A non-transitory computer readable medium storing instructions operable to cause one or more processors to perform operations comprising:
   enabling a video conference session accessible by internal device users within an organization and an external device user external to the organization;
   facilitating a first portion of the video conference session between the external device user and a first internal device user of the internal device users using a first video conference software license issued to the first internal device user; and facilitating a second portion of the video conference session between the external device user and a second internal device user of the internal device users using a second video conference software license issued to the second internal device user.

10. The non-transitory computer readable medium of claim 9, wherein the video conference session is enabled using a video conference software license issued to a third internal device user scheduling the video conference session.

11. The non-transitory computer readable medium of claim 9, the operations comprising:
releasing the first video conference software license upon a beginning of the second portion of the video conference session.

12. The non-transitory computer readable medium of claim 9, wherein the external device user remains connected to the video conference session even where no video conference software license is detected for use with the video conference session.

13. The non-transitory computer readable medium of claim 9, the operations comprising:
detecting the first video conference software license in connection with the first portion of the video conference session; and
detecting the second video conference software license in connection with the second portion of the video conference session.

14. An apparatus, comprising:
a memory; and
a processor configured to execute instructions stored in the memory to:
enable a video conference session accessible by internal device users within an organization and an external device user external to the organization;
facilitate a first portion of the video conference session between the external device user and a first internal device user of the internal device users using a first video conference software license issued to the first internal device user; and
facilitate a second portion of the video conference session between the external device user and a second internal device user of the internal device users using a second video conference software license issued to the second internal device user.

15. The apparatus of claim 14, wherein multiple video conference software licenses are detected for use with the video conference session, and wherein the processor is configured to execute the instructions to:
determine one or more of the multiple video conference software licenses to release.

16. The apparatus of claim 14, wherein the external device user is moved to a virtual waiting room space associated with the video conference session based on a failure to detect a video conference software license.

17. The apparatus of claim 14, wherein the processor is configured to execute the instructions to:
update functionality of the video conference session based on a detection of a threshold number of video conference software licenses.

18. The apparatus of claim 14, wherein the processor is configured to execute the instructions to:
detect the first video conference software license using license data obtained from a device of the first internal device user.

19. The apparatus of claim 14, wherein a recording of the video conference session is made accessible to the external device user, the first internal device user, and the second internal device user.

20. The apparatus of claim 14, wherein the first video conference software license and the second video conference software license are issued at a team-level within the organization.

* * * * *